(12) United States Patent
Scheffler et al.

(10) Patent No.: US 9,787,092 B2
(45) Date of Patent: Oct. 10, 2017

(54) AIRCRAFT POWER MANAGEMENT SYSTEM AND METHOD FOR MANAGING POWER SUPPLY IN AN AIRCRAFT

(71) Applicant: Airbus Operations GmbH, Hamburg (DE)

(72) Inventors: Sebastian Scheffler, Hamburg (DE); Frank Leuenberger, Hamburg (DE)

(73) Assignee: Airbus Operations GmbH (DE)

( * ) Notice: Subject to any disclaimer, the term of this patent is extended or adjusted under 35 U.S.C. 154(b) by 193 days.

(21) Appl. No.: 14/552,593

(22) Filed: Nov. 25, 2014

(65) Prior Publication Data
US 2015/0148995 A1 May 28, 2015

(30) Foreign Application Priority Data
Nov. 28, 2013 (EP) ..................................... 13194913

(51) Int. Cl.
*B64C 19/00* (2006.01)
*H02J 1/14* (2006.01)
(Continued)

(52) U.S. Cl.
CPC ........ *H02J 1/14* (2013.01); *H02J 3/14* (2013.01); *H02J 4/00* (2013.01);
(Continued)

(58) Field of Classification Search
None
See application file for complete search history.

(56) References Cited

U.S. PATENT DOCUMENTS 5,583,419 A 12/1996 Haller
5,936,318 A 8/1999 Weiler et al.
(Continued)

FOREIGN PATENT DOCUMENTS

DE 195 02 786 C2 2/1997
DE 196 17 915 A1 11/1997
(Continued)

OTHER PUBLICATIONS

Shurchkov, WO2013/109169 (WIPO Bing translation Jan. 28, 2017), all pages.*
(Continued)

*Primary Examiner* — Fadey Jabr
*Assistant Examiner* — Kevin P Mahne
(74) *Attorney, Agent, or Firm* — Lerner, David, Littenberg, Krumholz & Mentlik, LLP

(57) ABSTRACT

An aircraft power management system includes an electrical power supply input configured to be coupled to an electrical power supply, a first power supply bus bar coupled to the power supply input, at least one primary electrical equipment including a primary load coupled in parallel to the first power supply bus bar, a bus bar switch configured to selectively deactivate the first power supply bus bar downstream of the at least one primary electrical equipment, a load monitoring device configured to monitor the power demand of the primary load and to output a deactivation signal to the bus bar switch for selectively deactivating the first power supply bus bar, if the monitored power demand of the primary load exceeds a primary threshold, and at least one tertiary electrical equipment including a tertiary load coupled to the first power supply bus bar downstream of the at least one primary electrical equipment.

6 Claims, 2 Drawing Sheets

(51) Int. Cl.
*H02J 3/14* (2006.01)
*H02J 4/00* (2006.01)
*B64D 11/00* (2006.01)

(52) U.S. Cl.
CPC .. *B64D 2011/0053* (2013.01); *B64D 2221/00* (2013.01); *B64D 2231/025* (2013.01); *Y10T 307/414* (2015.04)

(56) References Cited

U.S. PATENT DOCUMENTS

| | | | |
|---|---|---|---|
| 6,921,987 | B2 | 7/2005 | Marin-Martinod |
| 7,098,555 | B2 | 8/2006 | Glahn et al. |
| 8,935,011 | B2 | 1/2015 | Tischer |
| 2007/0241614 | A1 | 10/2007 | Busdiecker et al. |
| 2007/0296273 | A1 | 12/2007 | Reitmann et al. |
| 2008/0027592 | A1 | 1/2008 | Fernandez-Ramos |
| 2009/0152942 | A1 | 6/2009 | Waite et al. |
| 2010/0270858 | A1* | 10/2010 | Foch ............ B64D 13/06 307/9.1 |
| 2011/0291411 | A1* | 12/2011 | Folken ............ H02H 7/30 290/7 |
| 2012/0228426 | A1* | 9/2012 | Schneider ............ B64D 11/003 244/118.5 |
| 2013/0009465 | A1* | 1/2013 | Bajjuri ............ B60R 16/02 307/9.1 |
| 2013/0158750 | A1 | 6/2013 | Bosson et al. |
| 2014/0240902 | A1* | 8/2014 | Burch ............ H02B 7/06 361/626 |
| 2015/0045976 | A1 | 2/2015 | Li |
| 2015/0045978 | A1 | 2/2015 | Yoshiguchi et al. |

FOREIGN PATENT DOCUMENTS

| | | |
|---|---|---|
| DE | 10 2006 028823 A1 | 1/2008 |
| EP | 1 387 460 A2 | 2/2004 |
| EP | 2 166 636 A2 | 3/2010 |
| EP | 2 579 412 A1 | 4/2013 |
| WO | 2011/081943 A2 | 7/2011 |
| WO | WO2013109169 * | 7/2013 |

OTHER PUBLICATIONS

Search Report EP 13194913.3 dated May 12, 2014.
Search Report dated May 12, 2014 (EP 13194909.1).

* cited by examiner

US 9,787,092 B2

AIRCRAFT POWER MANAGEMENT SYSTEM AND METHOD FOR MANAGING POWER SUPPLY IN AN AIRCRAFT

FIELD OF THE INVENTION

The present invention pertains to an aircraft power management system and a method for managing power supply in an aircraft.

BACKGROUND OF THE INVENTION

In airborne vehicles there is a high demand for electrical power which is distributed among a multitude of different electrically operated aircraft components. Demand for electrical power is highly volatile depending on system dynamics, human behaviour and vehicle operation state. Considering the constraints in system weight, required implementation space and wiring requirements, it is a complex task to fulfill all electrical power needs while keeping the power generation and distribution system in operation without exceeding the capabilities of the system at any point in time during operation of the airborne vehicle.

If a fault occurs in the power generation system, the maximum acceptable load may be reduced in order to avoid an overload, for example by shedding specific loads or electrical bus bars. Such shedding procedures are usually globally applied, and all components or equipments being serviced with the same shed bus bar are switched off while different approaches may be used to keep the noticeable effect on the shedded loads as small as possible. One approach may be to shed a minimum number of components or equipments to avoid an overload of the power generation system.

In typical aircraft system designs, the electrical power generation system is furthermore designed to provide the sum of the maxima of all connected equipments. As long as not being precluded by the operation state of the vehicle, electrical loads from equipments may occur at any time and independently from load requirements of other equipments. This allows for many electrical equipments to be activated at the same time, even if there is no specific use case tied to that situation. For example, the operation state of a vehicle such as an aircraft, precludes the activation of the cargo loading system during flight. But if an electrical equipment is activated by a human such as an passenger of an aircraft, the operational state of the aircraft is an insufficient parameter to predict the activation of such an equipment.

The document EP 1 387 460 A1 discloses a power supply arrangement for the galley of an airborne vehicle which utilizes control command provided by a control unit that manages the power consumption of galley equipment depending on individual operating conditions of the equipment.

The document DE 195 02 786 C2 discloses a method for protecting an electrical network from overload by inhibiting the activation of electrical equipment which would else cause an overload.

The document US 2008/0027592 A1 discloses an avionic system and architecture with integrated power management that assigns electrical loads to distribution nodes according to their criticality level for the safety of the aircraft.

BRIEF SUMMARY OF THE INVENTION

It is one idea of the invention to provide solutions for power management in an aircraft that keeps the total amount of consumed electrical power as low as possible and that reduces the efforts needed to distribute the electrical power among aircraft equipment and components.

Accordingly, an aircraft power management system comprises an electrical power supply input configured to be coupled to an electrical power supply, a first power supply bus bar coupled to the power supply input, at least one primary electrical equipment including a primary load and a bus bar switch, the primary load being coupled in parallel to the first power supply bus bar, and the bus bar switch being configured to selectively deactivate the first power supply bus bar downstream of the at least one primary electrical equipment, and at least one tertiary electrical equipment including a tertiary load being coupled to the first power supply bus bar downstream of the at least one primary electrical equipment, wherein the at least one primary electrical equipment further includes a load monitoring device configured to monitor the power demand of the primary load and to output a deactivation signal to the bus bar switch for selectively deactivating the first power supply bus bar, if the monitored power demand of the primary load exceeds a primary threshold.

Accordingly, a method for managing power supply in an aircraft having a power management system according to an embodiment of the invention comprises operating the tertiary load of the tertiary electrical equipment, monitoring the power demand of the primary load of the primary electrical equipment, and selectively deactivating the first power supply bus bar, if the monitored power demand of the primary load exceeds a primary threshold.

Accordingly, a hatrack for an aircraft comprises a power management system of according to an embodiment of the invention.

Another idea of the present invention is to localize power management function in or with electrical components that have a function of higher or equal criticality for the aircraft than the criticality level of power management itself. For effectively using electrical power by local power management, the aircraft operational state and the system dynamics are subject to the principles of mutually exclusive activation. The main concept involves exploiting the knowledge that simultaneous activation of at least two loads is either impossible to happen, i.e. natural mutually exclusive activation, or can be prohibited by the power management without significant loss in performance of the two loads, i.e. forced mutually exclusive activation.

According to an embodiment of the power management system, the power management system may further comprise at least one secondary electrical equipment including a secondary load and a bus bar switch, the secondary load being coupled in parallel to the first power supply bus bar downstream of the primary electrical equipment, and the bus bar switch of the secondary electrical equipment being configured to selectively deactivate the first power supply bus bar downstream of the secondary electrical equipment.

According to a further embodiment of the power management system, the at least one secondary electrical equipment may further include a load monitoring device configured to monitor the power demand of the secondary load and to output a deactivation signal to the bus bar switch for selectively deactivating the first power supply bus bar, if the monitored power demand of the secondary load exceeds a secondary threshold.

According to yet another embodiment of the power management system, the power management system may further comprise a second power supply bus bar coupled to the power supply input in parallel to the first power supply bus bar, at least one additional primary electrical equipment including a primary load and a bus bar switch, the primary load being coupled in parallel to the second power supply bus bar, and the bus bar switch being configured to selectively deactivate the second power supply bus bar downstream of the at least one additional primary electrical equipment, and at least one additional tertiary electrical equipment including a tertiary load being coupled to the second power supply bus bar downstream of the at least one additional primary electrical equipment, wherein the at least one additional primary electrical equipment further includes a load monitoring device configured to monitor the power demand of the primary load and to output a deactivation signal to the bus bar switch for selectively deactivating the second power supply bus bar, if the monitored power demand of the primary load exceeds a primary threshold.

BRIEF DESCRIPTION OF THE DRAWINGS

The invention will be explained in greater detail with reference to exemplary embodiments depicted in the drawings as appended.

The accompanying drawings are included to provide a further understanding of the present invention and are incorporated in and constitute a part of this specification. The drawings illustrate the embodiments of the present invention and together with the description serve to explain the principles of the invention. Other embodiments of the present invention and many of the intended advantages of the present invention will be readily appreciated as they become better understood by reference to the following detailed description. The elements of the drawings are not necessarily to scale relative to each other. Like reference numerals designate corresponding similar parts.

Figure 1:
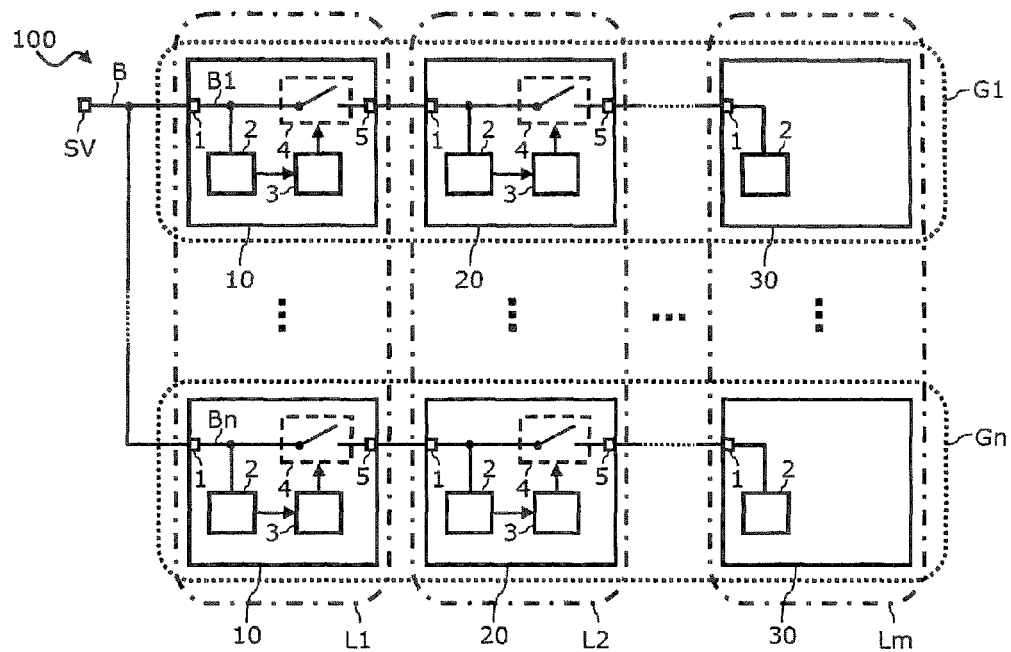
FIG. 1 schematically illustrates a power management architecture in an aircraft according to an embodiment of the invention.

In the figures, like reference numerals denote like or functionally like components, unless indicated otherwise. Any directional terminology like "top", "bottom", "left", "right", "above", "below", "horizontal", "vertical", "back", "front", and similar terms are merely used for explanatory purposes and are not intended to delimit the embodiments to the specific arrangements as shown in the drawings.

Although specific embodiments have been illustrated and described herein, it will be appreciated by those of ordinary skill in the art that a variety of alternate and/or equivalent implementations may be substituted for the specific embodiments shown and described without departing from the scope of the present invention. Generally, this application is intended to cover any adaptations or variations of the specific embodiments discussed herein.

Electrical power management in complex architectures and systems having a multitude of different electrical components, such as in aircraft or airborne vehicles in general, is subject to certain safety-relevant constraints that have to be taken into account when designing the system. On the other hand, the innate functions of electrical components themselves are tied with a certain criticality level—the higher the criticality of the function of the component for the safety of the aircraft, the more stringent and accurate the development process for that component will be. In turn, the more stringent the development process of a component, the higher the costs of development and manufacturing.

If additional functionality regarding power management is implemented in a component the functional criticality of which is comparably low, the development and manufacturing costs for that component increase by a significantly larger than for a component the functional criticality of which is comparably high. It is thus desirable to shift the responsibility of power management functions to components which already have functions which are regarded as comparably critical for the functioning of the overall system. In this case, the development and implementation process for the component is considered to be sufficiently stringent for the power management functionality as well.

By employing such an approach of selective local power management it is possible to group equipments according to their mutually exclusive activation schemes as explained above in the summary section. Advantageously, the implementation of the system comes along with reduced total electrical power demand of all components and therefore reduced power demand for the power generation system. Furthermore, the amount and size of electrical power supplies in the system may be reduced, which in turn leads to less system weight and implementation costs.

Power management systems within the meaning of the present application may include any group or installation of multiple different electrical equipments being supplied with power from a common power supply bus. For example, power management systems within the meaning of the present application may advantageously be employed in space limited environments, especially in airborne vehicles. Power management systems within the meaning of the present application may comprise, for example, lavatories, hatracks, aircraft seats, aircraft galleys, door actuation systems, cargo load bays and similar systems within an aircraft and/or the passenger cabin of an aircraft.

DETAILED DESCRIPTION

FIG. 1 schematically shows an illustration of an exemplary power management system 100 within an aircraft or airborne vehicle. The power management system 100 comprises an electrical power supply input SV which is configured to be coupled to an electrical power supply. The electrical power supply may in particular be adapted to the supply demand of the equipments in the power management system 100, i.e. in supply voltage level and supply voltage type (AC or DC).

The power supply input SV feeds a main power supply bus bar B which is turn is coupled to a first power supply bus bar B1. The first power supply bus bar B1 is configured to support the power supply for a first group G1 of equipments or electrical devices, generally denoted with reference signs 10, 20 or 30 depending on the respective criticality of their electrical main function. The electrical equipments 10 with the highest criticality level of their respective main electrical function are hereinforth denoted as primary electrical equipment 10. The electrical equipments 20 with a medium or intermediate criticality level of their respective main electrical function are hereinforth denoted as secondary electrical equipment 20. Finally, the electrical equipments 30 with the lowest criticality level of their respective main electrical function are hereinforth denoted as tertiary electrical equipment 30.

The first power supply bus bar B1 is coupled via an equipment terminal input 1 to the primary electrical equipment 10 of the first equipment group G1. As example, the equipment group G1 may be an assembly of electrical equipments in a hatrack. The primary electrical equipment 10 comprises a primary load 2 coupled in parallel to the first power supply bus bar B1. The primary load 2 may for example be an oxygen mask deployment system of a hatrack. Downstream of the equipment terminal input 1, a bus bar switch 4 is coupled into the bus bar, the bus bar switch 4 being configured to selectively deactivate the first power supply bus bar B1 downstream of the primary electrical equipment 10 of the first equipment group G1.

The primary electrical equipment 10 further includes a load monitoring device 3 which is coupled to both the primary load 2 and the bus bar switch 4 is configured to monitor the power demand of the primary load 2, for example by monitoring a drawn current of the primary load 2 or by detecting an activated operational state of the primary load 2, and to output a deactivation signal to the bus bar switch 4. The deactivation signal is configured to selectively deactivate the first power supply bus bar B1, if the monitored power demand of the primary load 2 exceeds a primary threshold. The primary threshold may for example be in particular zero, i.e. if the primary load 2 draws power from the first bus bar B1 at all, the equipments downstream of the primary electrical equipment 10 are cut off from the power supply input SV immediately.

This is particularly true for a tertiary electrical equipment 30 including a tertiary load 2 being coupled in parallel to the first power supply bus bar B1 downstream of the primary electrical equipment 10. The tertiary electrical equipment 30 likewise comprises an equipment input terminal 1, which is coupled to the first power supply bus bar B1. Unlike the primary electrical equipment 10, however, the tertiary electrical equipment 30 is the last equipment coupled to the first power supply bus bar B1, thus, the tertiary electrical equipment 30 does not need to comprise the bus bar switch 4 and the load monitoring device 3. The tertiary electrical equipment 30 in a hatrack may for example be the passenger reading light system with the tertiary load 2 being the passenger reading lights.

Taking a hatrack as an example for the first equipment group G1 in a power management system 100, the primary load 2 of the primary electrical equipment 10 may be a oxygen mask deployment device and the primary load 2 of the tertiary electrical equipment 30 may be the passenger reading lights in the hatrack. During flight the oxygen masks are only used in case of cabin decompression. However, due to the high criticality of this event, the oxygen containers are classified as safety essential equipment. Consequently, the oxygen mask deployment device needs to be taken into account for power supply independently of the flight situation.

On the other hand, the passenger reading lights need to be generally available for the whole duration of the flight, so that passengers can switch them on and off on demand. However, the passenger reading lights are considered to be not essential for the safety of the aircraft. Thus, in case of a fault in the electrical generation system with reduced performance the passenger reading lights may be deactivated without further significant effect for the safety of the aircraft.

Therefore, the oxygen mask deployment device and the passenger reading lights may be considered as mutually exclusive components which can be shared on the first power supply bus bar B1. In normal flight operation, the oxygen mask deployment system is not used, but its primary load 2 is available all the time and can be shared with the passenger reading lights. In case of cabin decompression, the oxygen mask deployment device demands power and the load monitoring device 3 of the primary electrical equipment 10 emits a deactivation signal to the bus bar switch 4. Then, the passenger reading light system is disconnected from the first power supply bus bar B1 to reserve the full power supply capacities to the oxygen mask deployment device.

Generally spoken, the equipment with the higher criticality hosts the power management function to avoid that the equipment with a lower criticality can contribute to a safety relevant failure. With such an architecture, the power supply system does not need to serve both the primary and the tertiary electrical equipments of the same equipment group at the same time. Thus, only the maximum load demand of the system with the higher load demand needs to be taken into account for the power generation system instead of the sum of the maximum load demands of both equipments.

The load with lower criticality may under normal flight conditions still be treated like a system with higher criticality since the whole power supply bus does not need to be shed in overload situations. This enhances the availability of lower criticality systems without compromising the stability of the whole power generation system.

Moreover, the maintenance of the electrical installation is simplified: Usually, to test the oxygen mask deployment system, all oxygen mask containers have to be set manually in a test position to avoid that all masks are deployed during the test and would have to be re-packaged. Instead of activating the oxygen mask deployment system, however, with the power management system 100, only the reading lights need to be switched to ensure that the oxygen mask deployment devices are properly powered. No manual access to the oxygen mask containers is needed for the test.

Finally, within normal operation of the aircraft, the oxygen mask deployment system is rarely used. Thus, most of the electrical connections in the cabin related to the oxygen mask deployment system remain unpowered most of the time. Degradation induced failure of the wires and/or connections would therefore remain hidden until the system is actually activated. With the power management system 100, the wires and connections to the oxygen mask deployment system are actually under constant use of the passenger reading lights. Therefore, a wire fault may readily be detected under non-critical safety conditions. This relaxes the requirements on the safety check intervals by a lot.

Optionally, the power management system 100 may include in the first power supply bus bar B1 at least one secondary electrical equipment 20 including a secondary load 2 and a bus bar switch 4, the secondary load 2 being coupled in parallel to the first power supply bus bar B1 downstream of the primary electrical equipment 10. The equipment input terminal 1 is coupled to the equipment output terminal 5 of the previous electrical equipment, in this the primary electrical equipment. Similar to the bus bar switch 4 of the primary electrical equipment 10, the bus bar switch 4 of the secondary electrical equipment 20 is configured to selectively deactivate the first power supply bus bar B1 downstream of the secondary electrical equipment 20.

The secondary electrical equipment 20 further includes a load monitoring device 3 configured to monitor the power demand of the secondary load 2 and to output a deactivation signal to the respective bus bar switch 4 for selectively deactivating the first power supply bus bar B1 downstream of the secondary electrical equipment 20, if the monitored power demand of the secondary load 2 exceeds a secondary threshold.

In that manner, any number of secondary electrical equipments 20 may be coupled in series between the primary electrical equipment 10 and the tertiary electrical equipment 30, with the criticality of the ones downstream of the first power supply bus bar B1 decreasing with respect to the previous ones in series.

In some cases, loads are not designed to be put into mutually exclusive activation. Therefore, it may be possible to provide additional power supply bus bars Bn coupled to the power supply input SV in parallel to the first power supply bus bar B1, which may be similarly built-up with at least one additional primary electrical equipment 10 and at least one additional tertiary electrical equipment 30 as explained above. That way, multiple equipment groups G1 to Gn may be assembled, each with a respective primary electrical equipment 10 of higher criticality, associated with tertiary electrical equipments 30 of lower criticality. Again, any number of secondary electrical equipments 20 may be optionally coupled in series between the primary electrical equipment 10 and the tertiary electrical equipments 30. The electrical equipments 10, 20 or 30 or different groups G1 to Gn may be associated logically in criticality level groups L1, L2 to Lm, depending on the number m of different criticality levels overall.

Figure 2:
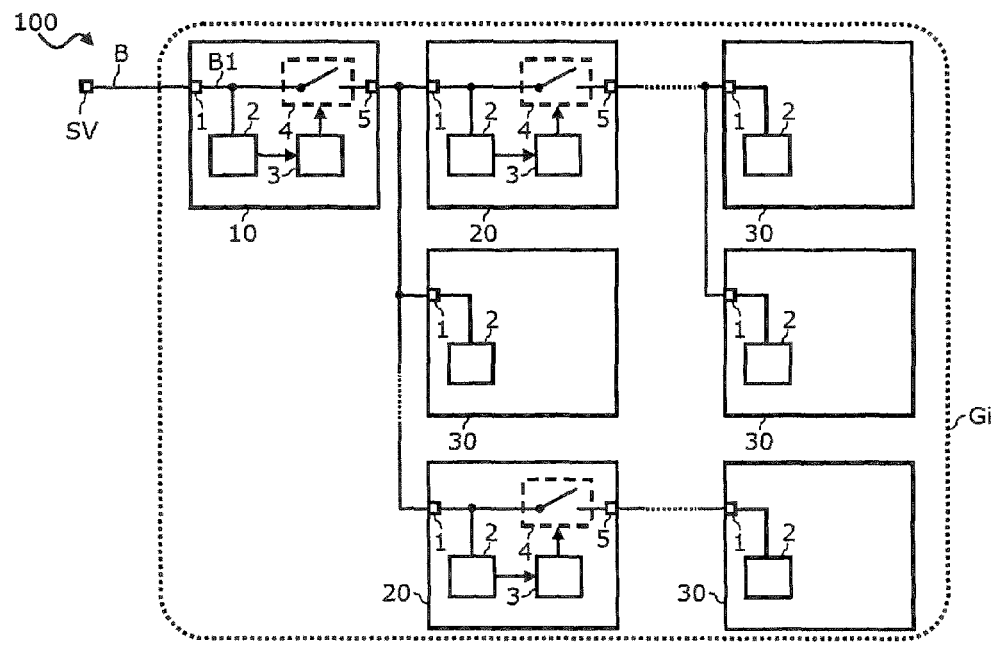
FIG. 2 schematically illustrates the power management architecture of FIG. 1 according to a further embodiment of the invention.

FIG. 2 schematically illustrates the power management architecture of FIG. 1 for a single equipment group Gi. The equipment group Gi may comprise multiple secondary electrical equipments 20 and tertiary electrical equipments 30 which have the same criticality level. Those equipments can be arranged in parallel to each other within the equipment group Gi by coupling their respective equipment input terminals in parallel to the equipment output terminal 5 of the primary electrical equipment 10. Again, any number of secondary and tertiary electrical equipments may be employed within any one equipment group Gi.

Figure 3:
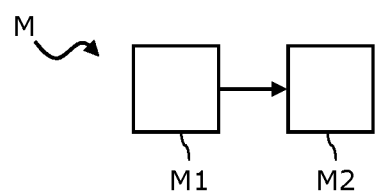
FIG. 3 schematically illustrates a method for managing power supply in an aircraft according to a further embodiment of the invention.

FIG. 3 shows a schematic illustration of a method M for managing power supply in an aircraft, specifically utilizing a power management system 100 as depicted in FIGS. 1 and 2.

The method M comprises as a first step M1 operating the tertiary load 2 of the tertiary electrical equipment 30. In a second step M2, the power demand of the primary load 2 of the primary electrical equipment 10 is monitored. Depending on the monitored power demand, i.e. if the monitored power demand of the primary load 2 exceeds a primary threshold, the first power supply bus bar B, B1 is selectively deactivated.

In the foregoing detailed description, various features are grouped together in one or more examples or examples with the purpose of streamlining the disclosure. It is to be understood that the above description is intended to be illustrative, and not restrictive. It is intended to cover all alternatives, modifications and equivalents. Many other examples will be apparent to one skilled in the art upon reviewing the above specification.

The embodiments were chosen and described in order to best explain the principles of the invention and its practical applications, to thereby enable others skilled in the art to best utilize the invention and various embodiments with various modifications as are suited to the particular use contemplated. In the appended claims and throughout the specification, the terms "including" and "in which" are used as the plain-English equivalents of the respective terms "comprising" and "wherein," respectively. Furthermore, "a" or "one" does not exclude a plurality in the present case.

The invention claimed is:

1. A power management system, comprising:
   an electrical power supply input configured to be coupled to an electrical power supply;
   a first power supply bus bar coupled to the power supply input;
   at least one primary electrical equipment including a primary load and a bus bar switch, the primary load being coupled to the first power supply bus bar, and the bus bar switch being configured to selectively deactivate the first power supply bus bar downstream of the at least one primary electrical equipment; and
   at least one tertiary electrical equipment including a tertiary load being coupled to the first power supply bus bar downstream of the at least one primary electrical equipment parallel to the primary load,
   wherein the at least one primary electrical equipment further includes a load monitoring device configured to monitor the power demand of the primary load and to output a deactivation signal to the bus bar switch for selectively deactivating the first power supply bus bar downstream of the at least one primary electrical equipment, when the monitored power demand of the primary load exceeds a primary threshold, the primary threshold being zero.

2. The power management system according to claim 1, further comprising:
   at least one secondary electrical equipment including a secondary load and a bus bar switch, the secondary load being coupled to the first power supply bus bar downstream of the primary electrical equipment and upstream of the tertiary electrical equipment parallel to the primary load, and the bus bar switch of the secondary electrical equipment being configured to selectively deactivate the first power supply bus bar downstream of the secondary electrical equipment.

3. The power management system according to claim 2, wherein the at least one secondary electrical equipment further includes a load monitoring device configured to monitor the power demand of the secondary load and to output a deactivation signal to the bus bar switch of the secondary electrical equipment for selectively deactivating the first power supply bus bar downstream of the secondary electrical equipment, when the monitored power demand of the secondary load exceeds a secondary threshold.

4. The power management system according to claim 1, further comprising:
   a second power supply bus bar coupled to the power supply input in parallel to the first power supply bus bar;
   at least one additional primary electrical equipment including a primary load and a bus bar switch, the primary load being coupled to the second power supply bus bar, and the bus bar switch being configured to selectively deactivate the second power supply bus bar downstream of the at least one additional primary electrical equipment; and
   at least one additional tertiary electrical equipment including a tertiary load being coupled to the second power supply bus bar downstream of the at least one additional primary electrical equipment parallel to the primary load of the at least one additional primary electrical equipment,
   wherein the at least one additional primary electrical equipment further includes a load monitoring device configured to monitor the power demand of the primary load of said at least one additional primary electrical equipment and to output a deactivation signal to the bus bar switch for selectively deactivating the second power supply bus bar downstream of the at least one additional primary electrical equipment, when the monitored power demand of the primary load of said at least one additional primary electrical equipment exceeds a primary threshold.

5. A hatrack of an aircraft, comprising:
a power management system comprising:
an electrical power supply input configured to be coupled to an electrical power supply;
a first power supply bus bar coupled to the power supply input;
at least one primary electrical equipment including a primary load and a bus bar switch, the primary load being coupled to the first power supply bus bar, and the bus bar switch being configured to selectively deactivate the first power supply bus bar downstream of the at least one primary electrical equipment; and
at least one tertiary electrical equipment including a tertiary load being coupled to the first power supply bus bar downstream of the at least one primary electrical equipment parallel to the primary load,
wherein the at least one primary electrical equipment further includes a load monitoring device configured to monitor the power demand of the primary load and to output a deactivation signal to the bus bar switch for selectively deactivating the first power supply bus bar downstream of the at least one primary electrical equipment, when the monitored power demand of the primary load exceeds a primary threshold,
wherein the primary electrical equipment is an oxygen mask deployment system, and
wherein the tertiary electrical equipment is a passenger reading light.

6. A method for managing power supply in an aircraft having a power management system of claim 1, the method comprising:
operating the tertiary load of the tertiary electrical equipment;
monitoring the power demand of the primary load of the primary electrical equipment; and
selectively deactivating the first power supply bus bar downstream of the at least one primary electrical equipment, when the monitored power demand of the primary load exceeds a primary threshold, the primary threshold being zero.

* * * * *